United States Patent
Kiilerich Pratas et al.

(10) Patent No.: US 12,185,418 B2
(45) Date of Patent: Dec. 31, 2024

(54) RADIO SIDELINK RELAY OF SMALL DATA TRANSMISSIONS

(71) Applicant: NOKIA TECHNOLOGIES OY, Espoo (FI)

(72) Inventors: Nuno Manuel Kiilerich Pratas, Gistrup (DK); Vinh Van Phan, Oulu (FI); Berthold Panzner, Holzkirchen (DE); Ling Yu, Kauniainen (FI); Faranaz Sabouri-Sichani, Aalborg (DK); Prajwal Keshavamurthy, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 410 days.

(21) Appl. No.: 17/674,471

(22) Filed: Feb. 17, 2022

(65) Prior Publication Data
US 2023/0262442 A1    Aug. 17, 2023

(51) Int. Cl.
*H04W 4/70*    (2018.01)
*H04L 67/12*    (2022.01)
*H04W 8/00*    (2009.01)
*H04W 76/20*    (2018.01)
*H04W 84/04*    (2009.01)
(Continued)

(52) U.S. Cl.
CPC ........... *H04W 8/005* (2013.01); *H04W 76/20* (2018.02); *H04W 84/042* (2013.01); *H04W 88/04* (2013.01); *H04W 92/18* (2013.01)

(58) Field of Classification Search
CPC .......... H04W 8/005; H04W 76/20; H04W 84/042; H04W 88/04; H04W 92/18
See application file for complete search history.

(56) References Cited

U.S. PATENT DOCUMENTS

2013/0080597 A1* 3/2013 Liao .................. H04L 5/0001
                                                           709/219
2017/0353819 A1* 12/2017 Yin .................... H04W 4/70
2020/0100088 A1    3/2020 Kim et al.
(Continued)

FOREIGN PATENT DOCUMENTS

WO    WO-2018128505 A1 *  7/2018  ............ H04W 48/08
WO    WO-2022184402 A1 *  9/2022  ............ H04W 48/02

OTHER PUBLICATIONS

3GPP TSG-RAN WG1 Meeting#108-e, R1-2202656 Title: Raply Ls on te hphysical layer aspects of small data transmission (Year: 2022).*

(Continued)

*Primary Examiner* — Faruk Hamza
*Assistant Examiner* — Abusayeed M Haque
(74) *Attorney, Agent, or Firm* — SQUIRE PATTON BOGGS (US) LLP

(57) ABSTRACT

Systems, methods, apparatuses, and computer program products for new radio (NR) sidelink relay of small data transmissions (SDT) are provided. One method may include determining whether conditions to use SDT via at least one relay user equipment are met. When it is determined that the conditions to use the SDT are met, the method may include transmitting a SDT relaying request comprising a SDT payload to the at least one relay user equipment. The method may also include receiving a SDT response, from the at least one relay user equipment, based on how the SDT relaying request is transmitted.

20 Claims, 7 Drawing Sheets

(51) Int. Cl.
    *H04W 88/04*     (2009.01)
    *H04W 92/18*     (2009.01)

(56) References Cited

U.S. PATENT DOCUMENTS

| | | | | |
|---|---|---|---|---|
| 2021/0377844 | A1* | 12/2021 | Tseng | H04W 48/10 |
| 2022/0086946 | A1* | 3/2022 | Huang | H04W 72/23 |
| 2022/0132464 | A1* | 4/2022 | Agiwal | H04W 24/08 |
| 2023/0156802 | A1* | 5/2023 | Elshafie | H04W 74/006 |
| | | | | 370/329 |
| 2023/0328670 | A1* | 10/2023 | Miao | H04W 76/20 |
| | | | | 370/503 |

OTHER PUBLICATIONS

3GPP TSG-RAN WG3#111-e R3-210881 Title: Discussion on connected mode mobility in eNPN (Year: 2021).*

Extended European Search Report dated Jun. 19, 2023 corresponding to European Patent Application No. 23150953.0.

3GPP TS 36.331 V16.7.0 (Dec. 2021), Technical Specification, 3rd Generation Partnership Project; Technical Specification Group Radio Access Network; Evolved Universal Terrestrial Radio Access (E-UTRA); Radio Resource Control (RRC); Protocol specification (Release 16), Dec. 2021.

ZTE Corporation, "Work Item on NR small data transmissions in Inactive state", RP-201305, 3GPP TSG RAN Meeting #88e, Jun. 29, 2020.

3rd Generation Partnership Project; Technical Specification Group Services and System Aspects; Feasibility Study on New Services and Markets Technology Enablers; Stage 1 (Release 14), 3GPP TR 22.891, V14.2.0, Sep. 2016.

3rd Generation Partnership Project; Technical Specification Group Radio Access Network; Study on NR sidelink relay; (Release 17), 3GPP TR 38.836, V17.0.0, Mar. 2021.

3rd Generation Partnership Project; Technical Specification Group Services and System Aspects; Proximity based Services (ProSe) in the 5G System (5GS) (Release 17); 3GPP TS 23.304, V17.1.1, Jan. 2022.

* cited by examiner

RADIO SIDELINK RELAY OF SMALL DATA TRANSMISSIONS

FIELD

Some example embodiments may generally relate to communications including mobile or wireless telecommunication systems, such as Long Term Evolution (LTE) or fifth generation (5G) radio access technology or new radio (NR) access technology or 5G beyond (e.g., 6G) access technology, or other communications systems. For example, certain example embodiments may generally relate to systems and/or methods for NR sidelink relay of small data transmissions (SDT).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology, 5G beyond and/or sixth generation (6G) radio access technology. 5G wireless systems refer to the next generation (NG) of radio systems and network architecture. A 5G system may be mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 5G beyond or 6G is expected to support further use cases beyond current mobile use scenarios, such as virtual and augmented reality, artificial intelligence, instant communications, improved support of IoT, etc.

SUMMARY

An embodiment may be directed to an apparatus including at least one processor and/or at least one memory comprising computer program code. The at least one memory and computer program code may be configured, with the at least one processor, to cause the apparatus at least to: determine whether conditions to use small data transmission (SDT) via at least one relay user equipment are met. When it is determined that the conditions to use the small data transmission (SDT) are met, the apparatus may be caused to transmit a small data transmission (SDT) relaying request comprising a small data transmission (SDT) payload to the at least one relay user equipment, and receive a small data transmission (SDT) response, from the at least one relay user equipment.

An embodiment may be directed to an apparatus including means for determining whether conditions to use small data transmission (SDT) via at least one relay user equipment are met. When it is determined that the conditions to use the small data transmission (SDT) are met, the apparatus may include means for transmitting a small data transmission (SDT) relaying request comprising a small data transmission (SDT) payload to the at least one relay user equipment, and means for receiving a small data transmission (SDT) response, from the at least one relay user equipment.

An embodiment may be directed to a method including determining whether conditions to use small data transmission (SDT) via at least one relay user equipment are met. When it is determined that the conditions to use the small data transmission (SDT) are met, the method may include transmitting a small data transmission (SDT) relaying request comprising a small data transmission (SDT) payload to the at least one relay user equipment. The method may also include receiving a small data transmission (SDT) response, from the at least one relay user equipment.

In one embodiment, the method may include or the apparatus may be caused to receive a discovery announcement message from at least one relay user equipment in a vicinity of the remote UE or apparatus, wherein the discovery announcement message comprises an indication of whether small data transmission (SDT) is supported by the at least one relay user equipment.

In one embodiment, to determine whether the conditions to use the small data transmission (SDT) are met, the method may include or the apparatus may be caused to determine whether the at least one relay user equipment supports small data transmission (SDT) based on the indication received in the discovery announcement message.

In one embodiment, the discovery announcement message may include or the apparatus may be configured to obtain at least one of: a public land mobile network (PLMN) and cell identifier (ID) of a network that the at least one relay user equipment is connected to, an indication whether the at least one relay user equipment supports on-the-fly small data transmission (SDT) relaying or small data transmission (SDT) relaying later within a time limit suitable for the at least one relay user equipment, and/or an indication of a supported maximum payload size for the small data transmission (SDT).

In one embodiment, the public land mobile network (PLMN) and cell identifier (ID) of a network is used to determine at least one of: a configuration of the conditions to use small data transmission (SDT), and/or whether the conditions to use small data transmission are met.

In one embodiment, the small data transmission (SDT) may include at least one of user equipment (UE)-to-network relay small data transmission (SDT) and/or small data transmission (SDT) over a direct interface between the remote UE/apparatus and a network node.

In one embodiment, the method may include or the apparatus may be caused to apply criteria to determine whether the at least one relay user equipment supports small data transmission (SDT). The applying of the criteria may include at least one of: determining if at least one of user equipment (UE)-to-network relay small data transmission (SDT) or small data transmission (SDT) over a direct interface between the remote UE/apparatus and a network node meet the criteria, determining if the discovery announcement message indicates support of small data transmission (SDT) relaying for a public land mobile network (PLMN) of the remote UE/apparatus, determining if reference signal received power (RSRP) observed by the remote UE/apparatus is below a configured threshold where the reference signal received power (RSRP) is measured from the discovery announcement message or from one or more synchronization signal blocks, determining if the small data transmission (SDT) payload is below a configured threshold, and/or determining if a channel busy ratio observed by the remote UE/apparatus regarding a sidelink resource pool used for communication with the at least one relay user equipment is below a configured threshold.

In one embodiment, when it is determined that the conditions to use the user equipment (UE)-to-network relay small data transmission (SDT) are not met, the method may include or the apparatus may be caused to fall back to using small data transmission (SDT) directly to the serving network node or using the at least one relay user equipment with regular relaying mode for the small data transmission (SDT).

In one embodiment, the small data transmission (SDT) payload may include at least one of: a resume request including at least one of the remote UE's/apparatus' inactive radio network temporary identifier (I-RNTI), message authentication code-integrity (MAC-I), or resume cause, the actual small data transmission (SDT) payload when the remote UE/apparatus transitioned from inactive state to connected state, and/or an indication of whether the small data transmission (SDT) payload allows for time deferred small data transmission (SDT) relaying or requires immediate small data transmission (SDT) relaying.

In one embodiment, when PC5 connection establishment between the remote UE/apparatus and the at least one relay user equipment is needed, the method may include or the apparatus may be caused to transmit the small data transmission (SDT) relaying request using a direct communication request (DCR). In one embodiment, when PC5 connection establishment between the remote UE/apparatus and the at least one relay user equipment is not needed, the method may include or the apparatus may be caused to transmit the small data transmission (SDT) relaying request using an existing PC5 connection or a new PC5 connection for carrying the small data transmission (SDT) relaying request.

In one embodiment, the method may include or the apparatus may be caused to determine to retransmit or duplicate the small data transmission (SDT) relaying request via the at least one relay user equipment or a different relay user equipment, depending on the small data transmission (SDT) response received from the at least one relay device.

An embodiment may be directed to an apparatus including at least one processor and/or at least one memory comprising computer program code. The at least one memory and computer program code may be configured, with the at least one processor, to cause the apparatus at least to: transmit a discovery announcement message to at least one remote user equipment in a vicinity of the apparatus. The discovery announcement message includes at least an indication that small data transmission (SDT) is supported by the apparatus. The apparatus may also be caused to receive a small data transmission (SDT) relaying request comprising a small data transmission (SDT) payload from the at least one remote user equipment, and relay the small data transmission (SDT) payload to a network node.

An embodiment may be directed to an apparatus including means for transmitting a discovery announcement message to at least one remote user equipment in a vicinity of the apparatus. The discovery announcement message includes at least an indication that small data transmission (SDT) is supported by the apparatus. The apparatus may also include means for receiving a small data transmission (SDT) relaying request comprising a small data transmission (SDT) payload from the at least one remote user equipment, and means for relaying the small data transmission (SDT) payload to a network node.

An embodiment may be directed to a method including transmitting, by a relay user equipment, a discovery announcement message to at least one remote user equipment in a vicinity of the relay user equipment. The discovery announcement message includes at least an indication that small data transmission (SDT) is supported by the relay user equipment. The method may also include receiving a small data transmission (SDT) relaying request comprising a small data transmission (SDT) payload from the at least one remote user equipment, and relaying the small data transmission (SDT) payload to a network node.

In one embodiment, based on the small data transmission (SDT) payload received from the at least one remote user equipment, the method may include or the apparatus may be caused to determine whether to proceed with immediate relay of the small data transmission (SDT) payload or to defer in time the relay of the small data transmission (SDT) payload.

In one embodiment, the small data transmission (SDT) supported by the relay UE/apparatus may include at least one of user equipment (UE)-to-network relay small data transmission (SDT) and/or small data transmission (SDT) over a direct interface between the apparatus and the network node.

In one embodiment, the discovery announcement message may include at least one of: a public land mobile network (PLMN) and cell identifier (ID) of the network that the apparatus is connected to, an indication whether the apparatus supports on-the-fly small data transmission (SDT) relaying or small data transmission (SDT) relaying later within a time limit suitable for the apparatus, and/or an indication of a supported maximum payload size for the small data transmission (SDT).

In one embodiment, the small data transmission (SDT) payload may include at least one of: a resume request including at least one of the remote user equipment's inactive radio network temporary identifier (I-RNTI), message authentication code-integrity (MAC-I), or resume cause, the actual small data transmission (SDT) payload when the remote user equipment transitioned from a connected state to inactive state, and/or an indication of whether the small data transmission (SDT) payload allows for time deferred small data transmission (SDT) relaying or requires immediate small data transmission (SDT) relaying.

In one embodiment, the method may include or the apparatus may be configured to determine to proceed with the immediate relay of the small data transmission (SDT) payload when the small data transmission (SDT) payload indicates a need for immediate small data transmission (SDT) relaying or when an associated packet delay budget indicates a need for immediate small data transmission (SDT) relaying. In this embodiment, the method may also include or the apparatus may be configured to forward the small data transmission (SDT) payload to the network node, transition to a connected state if the apparatus is not already in the connected state, and/or receive, from the network node, a small data transmission (SDT) relay response comprising a release with suspend configuration so that the at least one remote user equipment can return to inactive state and optionally comprising a downlink small data transmission (SDT) payload.

In one embodiment, the method may include or the apparatus may be configured to determine to defer in time the relay of the small data transmission (SDT) payload when the small data transmission (SDT) payload indicates that it does not require immediate small data transmission (SDT) relaying or when an associated packet delay budget indicates it does not require immediate small data transmission (SDT) relaying. In this embodiment, the method may then include or the apparatus may be caused to delay relaying of the small data transmission (SDT) payload until the apparatus is ready to forward the small data transmission (SDT) payload and when conditions to proceed with forwarding of the small data transmission (SDT) payload are met, forward the small data transmission (SDT) payload to a network node and receive, from the network node, a small data transmission (SDT) relay response comprising a release with suspend configuration so that the at least one remote user equipment can return to inactive state and optionally comprising a downlink small data transmission (SDT) payload.

In one embodiment, the conditions to proceed with the forwarding of the small data transmission (SDT) payload are met when at least one of: a current link quality of over a direct interface between the apparatus and the network node, which is measured based on a synchronization signal block (or other relevant downlink signal from which this quality can be determined such as CSI-RS), is above a configured reference signal received power (RSRP) threshold, and/or when the apparatus has collected sufficient small data transmission (SDT) and non-small data transmission (SDT) payloads of other remote user equipment to transmit the different payloads as part of a same transmission to the network node.

In one embodiment, the method may include or the apparatus may be caused to transmit, to the at least one remote user equipment, a direct communication response comprising the small data transmission (SDT) relay response.

BRIEF DESCRIPTION OF THE DRAWINGS

For proper understanding of example embodiments, reference should be made to the accompanying drawings, wherein.

DETAILED DESCRIPTION

Figure 1:
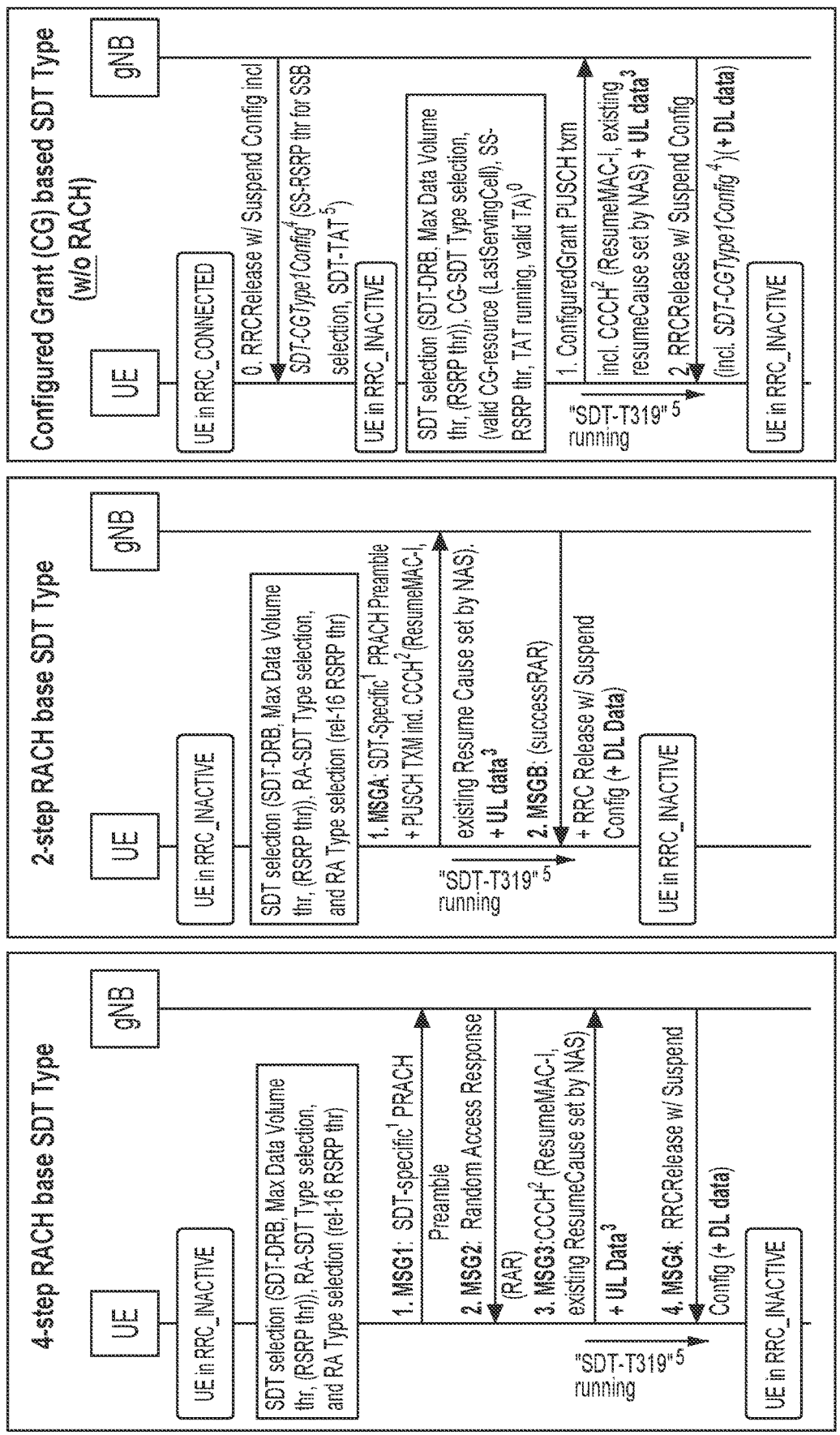
FIG. 1A illustrates an example signaling diagram of 4-step random access channel (RACH) based SDT.
FIG. 1B illustrates an example signaling diagram of 2-step RACH based SDT.
FIG. 1C illustrates an example signaling diagram of configured grant (CG) based SDT type without RACH.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for NR sidelink relay of small data transmissions, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments may provide enhancements to the sidelink (SL) relay functionality introduced in 3rd generation partnership project (3GPP) Release-17, so that a remote user device can utilize small data transmission (SDT) when its data traffic is relayed by a relay user device, e.g., in a UE-to-network relay scenario. It is noted that a user device may alternatively be referred to herein as a UE or mobile device, for example.

Currently, small and infrequent data transfers that are needed by a UE in the radio resource control (RRC) inactive state necessitate that a RRC connection resume is made to switch to the RRC connected state, where the small data can be transferred, followed by a subsequent suspension of the connection back to the RRC inactive state after the data transfer. This may occur for each data transmission no matter how small, resulting in unnecessary UE power consumption and signalling overhead as well as increased packet latency. However, the NR system is expected to be efficient and flexible for low throughput short data bursts by supporting efficient signalling mechanisms (e.g. signalling is less than payload) and reducing signalling overhead in general.

Some examples of small and/or infrequent data traffic that would benefit from the SDT procedure may include (but are not limited to): traffic from instant messaging (IM) services, heart-beat/keep-alive traffic from IM/email clients and other apps, push notifications from various applications, traffic from wearables, sensors (e.g., industrial wireless sensor networks transmitting temperature, pressure readings periodically or in an event triggered manner etc.), smart meters and smart meter networks sending periodic meter readings.

Therefore, consideration is currently being given to NR small data transmissions in RRC inactive state in order to address the inefficiencies explained above (i.e., the signalling overhead and delay associated with transition from RRC inactive to RRC connected state to perform a short data transmission). This functionality is important, since the motivation to introduce, in NR, the RRC INACTIVE state itself was to be able to transition UEs with infrequent data transmission to a state with minimum signalling overhead and minimum power consumption. An objective is to enable SDT in RRC inactive state as discussed in the following.

For the RRC inactive state, an objective is provide for UL small data transmissions for random access channel (RACH)-based schemes (i.e., 2-step and 4-step RACH). This is the general procedure to enable user plane (UP) data transmission for small data packets from inactive state (e.g., using MSGA or MSG3). UL SDTs for RACH-based schemes can enable flexible payload sizes larger than the Release-16 CCCH message size that is possible currently for inactive state for MSGA and MSG3 to support UP data transmission in UL (actual payload size can be up to network configuration), and context fetch and data forwarding (with and without anchor relocation) in INACTIVE state for RACH-based solutions. A further objective is the transmission of UL data on pre-configured physical uplink shared channel (PUSCH) resources (i.e., reusing the configured grant type 1)—when timing advance (TA) is valid. This is the general procedure for small data transmission over configured grant type 1 resources from inactive state, and can enable configuration of the configured grant type 1 resources for small data transmission in UL for inactive state.

FIG. 1A, FIG. 1B, and FIG. 1C illustrate examples of the three SDT-types defined in Release-17. More specifically, FIG. 1A illustrates an example signaling diagram of a 4-step RACH based SDT type that includes MSG1, MSG2, MSG3, and MSG4. FIG. 1B illustrates an example signaling diagram of a 2-step RACH based SDT type including two messages, MSGA and MSGB. FIG. 1C illustrates an example signaling diagram of configured grant (CG) based SDT type without RACH.

According to the above objectives, certain embodiments described herein may relate at least to the CG-SDT type. In 2-step RACH or "2-step RA SDT," as illustrated in FIG. 1B, the MsgA PUSCH is used to transmit the SDT payload. In 4-step RACH or "4-step RA SDT," as illustrated in FIG. 1A, the Msg3 (PUSCH) is used to transmit the SDT payload. In CG based SDT or "CG-SDT," as illustrated in FIG. 1C, UL data on pre-configured PUSCH resources, CG type 1 based PUSCH resources, can be used by the UE to transmit the SDT payload when it has a valid timing advance (TA) and other conditions are met, without a random access procedure.

Figure 2:
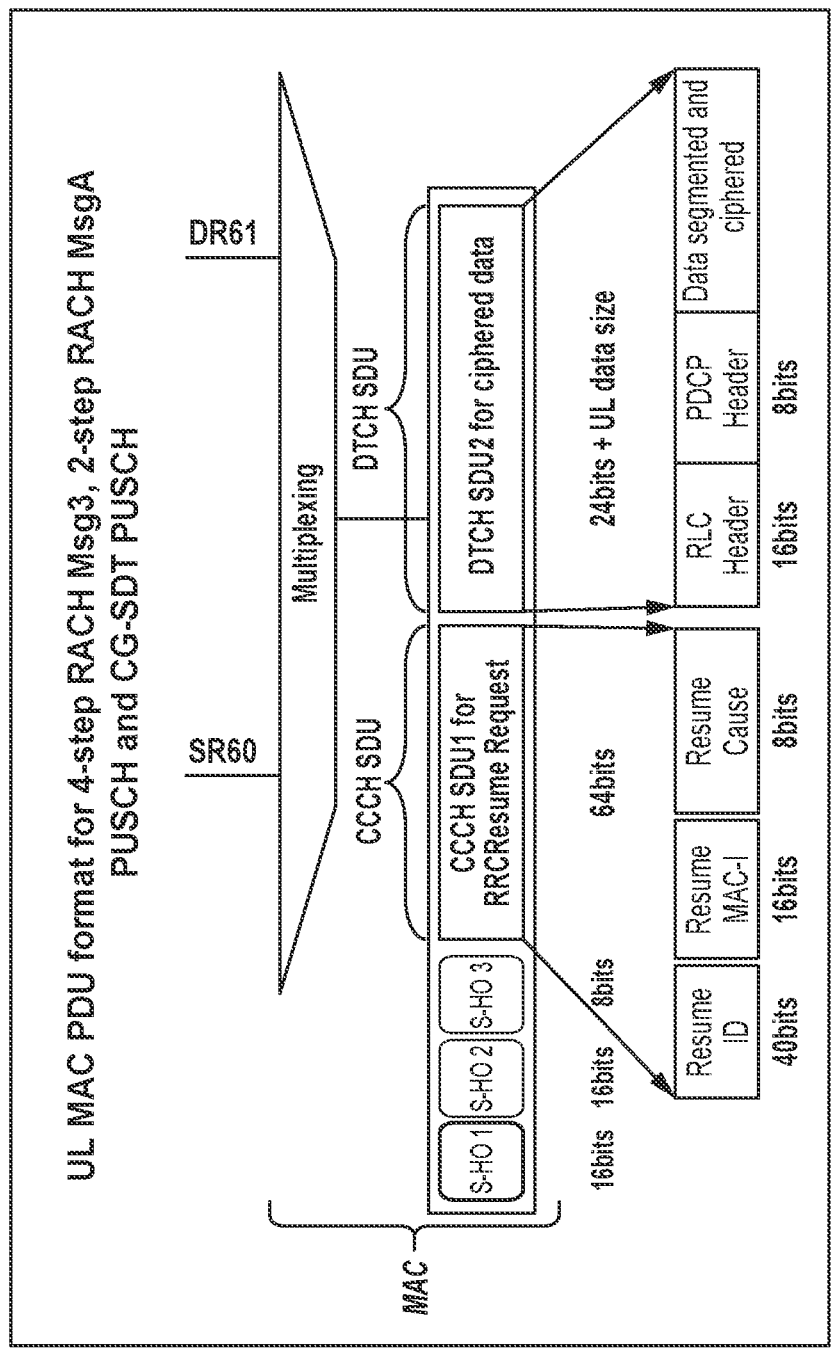
FIG. 2 illustrates an example of the uplink (UL) medium access control (MAC) protocol data unit (PDU) format used for the three types of SDT depicted in the examples of FIGS. 1A-1C.

For a UE configured to perform SDT, before proceeding with the SDT transmission, the UE performs a set of validation checks. The validation checks can be categorized as follows: reference signal received power (RSRP) check if SDT is allowed or not, data volume threshold, and/or CG validation criteria (in case of CG-SDT valid configuration), such as beam validation or timing alignment validation. These validation checks may be performed at the RRC and medium access control (MAC) level. FIG. 2 illustrates an example of the uplink (UL) MAC protocol data unit (PDU) format used for the three types of SDT depicted in the examples of FIGS. 1A-1C.

The first version of NR sidelink focuses on supporting vehicle-to-everything (V2X) related road safety services. The design aims to provide support for broadcast, groupcast and unicast communications in both out-of-coverage and in-network coverage scenarios. Then, sidelink-based relaying functionality was additionally studied in order for sidelink/network coverage extension and power efficiency improvement, considering wider range of applications and services.

A study of NR sidelink relay was carried out to cover the enhancements and solutions necessary to support the UE-to-network (U2N) relay coverage extension. The study covered discovery procedure, and both Layer-2 and Layer-3 U2N relay, including aspects of relay (re)selection, authorization, quality of service (QoS) management, service continuity, security, protocol stack design and control plane (CP) procedure. Mechanisms for Layer-2 relay and Layer-3 relay were also studied and identified by RAN2, striving for minimum specification impact. In this study, both L2 and L3 based relaying were found to be feasible, and it was recommended to support NR Sidelink Relay for coverage extension.

In relation to remote UE RRC connection establishment, the U2N remote UE may need to establish its own PDU sessions/data radio bearers (DRBs) with the network user plane data transmission. The legacy NR V2X PC5 unicast link establishment procedures can be reused to setup a secure unicast link between the U2N remote UE and the U2N relay UE before the remote UE establishes a Uu RRC connection with the network via the relay UE. The establishment of Uu SRB1/SRB2 and DRB of the U2N remote UE may be subject to Uu configuration procedures for L2 U2N relay. It is noted that, as discussed herein, Uu may refer to a direct interface between a UE and a network node (e.g., gNB).

5G proximity services (ProSe) U2N relay discovery may be applicable to both 5G ProSe Layer-3 and Layer-2 U2N relay discovery for public safety use and/or commercial services. To perform 5G ProSe U2N relay discovery, the 5G ProSe remote UE and the 5G ProSe U2N relay may be pre-configured or provisioned with related information for the relay discovery procedures.

A relay service code (RSC) is used in the 5G ProSe U2N relay discovery, to indicate the connectivity service the 5G ProSe U2N relay provides to the 5G ProSe remote UE. The RSCs can be configured on the 5G ProSe U2N relay and the 5G ProSe remote UE. The 5G ProSe U2N relay and the 5G ProSe remote UE are aware of whether a RSC is offering 5G ProSe Layer-2 (L2) or Layer-3 (L3) U2N relay service. A 5G ProSe U2N relay supporting multiple RSCs can advertise the RSCs using multiple discovery messages, with one RSC per discovery message. Additional information used for the 5G ProSe U2N relay (re)selection and connection maintenance can be advertised using a separate discovery messages of type "Relay Discovery Additional Information". This may include, for example, the related system information of the 5G ProSe U2N relay's serving cell. Both Model A and Model B discovery are supported. Model A uses a single discovery protocol message (announcement). Model B uses two discovery protocol messages (solicitation and response). For relay discovery additional information, only Model A discovery is used.

Figure 3:
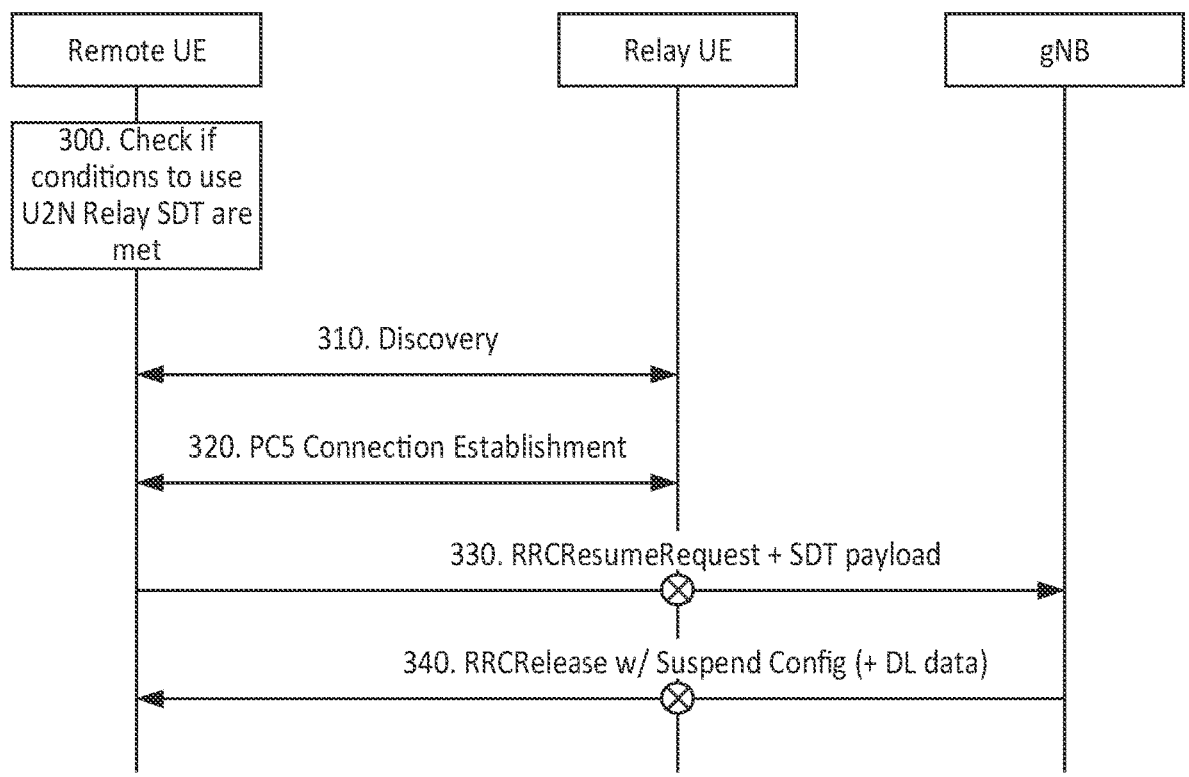
FIG. 3 illustrates an example signaling diagram depicting SDT via UE-to-network (U2N) relay according to layer 2 (L2) U2N relay architecture, according to one example.

FIG. 3 illustrates an example signaling diagram depicting SDT via U2N relay according to L2 U2N relay architecture, according to one example. As illustrated in the example of FIG. 3, at 300, the remote UE may check if conditions to use U2N relay SDT are met. If so, at 310, discovery may be performed between the remote UE and relay UE and, at 320, PC5 connection establishment may take place. In the example of FIG. 3, at 330, RRCResumeRequest+SDT payload is transmitted by the remote UE and is relayed by the relay UE. As illustrated in FIG. 3, at 340, RRCRelease with suspend configuration (+DL data) is transmitted by the gNB and relayed by the relay UE to the remote UE.

Based on the current L2 U2N sidelink relay architecture, the SDT feature can only be introduced with the signaling depicted in the example of FIG. 3, where the "RRCResumeRequest+SDT payload" transmitted by the remote UE is relayed by the relay UE after the discovery and PC5 connection establishment has taken place. This considers the case that the relay UE is in RRC connected state and ready for relaying towards the serving gNB. For the case that the relay UE is in RRC idle or RRC inactive state, the relay UE also needs to establish the network connection for relaying, resulting in further signaling overhead.

However, the L2 U2N Relay SDT procedure, when compared with the Uu SDT analogue, has a much higher number of signaling exchanges. This is due, for example, to the identification and selection of a suitable relay UE and establishment of PC5 connection, even when considering the case that the relay UE is in RRC connected state and ready for relaying, as shown in the Table 1 below. In particular, Table 1 illustrates a comparison of the signaling overhead for the different SDT options introduced above. As such, for the L2 U2N Relay SDT to be reasonable, further signaling optimization is desirable.

TABLE 1

| Interface | Type | Number of exchanged messages until SDT payload transmission |
|---|---|---|
| Uu | 4-step RACH SDT | 3 |
|  | 2-step RACH SDT | 1 |
|  | CG-SDT | 1 |
| PC5 | L2 U2N SDT | Model A: Discovery (1) + PC5 RRC (6) + 1 = 8 |
|  |  | Model B: Discovery (2) + PC5 RRC (6) + 1 = 9 |

Therefore, certain example embodiments provide a relay assisted SDT, such as a U2N relay SDT, which can significantly reduce the number of signaling messages exchanged before the SDT transmission from a remote UE or device can take place. According to an embodiment, the remote UE may transmit a SDT relaying request that may include SDT payload to a relay UE, depending on whether PC5 connection establishment between the remote UE and the relay UE is needed or not. For instance, in case the PC5 connection establishment is needed, the SDT relaying request may be, for example, transmitted using the direct connection request (DCR). In case the PC5 connection establishment is not needed, the SDT relaying request may be transmitted over an existing PC5 connection between the remote UE and the relay UE using, e.g., an existing PC5 message enhanced to incorporate the SDT relaying request or a new PC5 message introduced for carrying the SDT relaying request. The SDT relaying request may further include requirements and necessary UE contexts of the remote UE for the SDT, including a time budget for the SDT. It is noted that some embodiments are described herein with reference to U2N relay SDT; however, it should be understood that certain embodiments are not limited to U2N relay scenarios and may apply to other scenarios, such as but not limited to Uu SDT.

In an embodiment, the relay UE may respond to the SDT relaying request received from the remote UE with a SDT relaying response. According to certain embodiments, the SDT relaying response may depend on how the SDT relaying request is sent and received (i.e., which PC5 procedure is used to send the SDT relaying request), as well as a store-and-forward level applied at the relay UE for the SDT relaying request. This store-and-forward level may be determined by the relay UE based on the requirements for the SDT and the RRC state the relay UE is in upon receiving the SDT relaying request for minimizing overall protocol overhead while fulfilling the requirements. For example, if the relay UE is in RRC idle or RRC inactive state or the requirements for SDT are on a best-effort basis, then the relay UE may determine to relay for the SDT at a best suited time for the relay UE within the time budget indicated in the received SDT relaying request. According to certain embodiments, the SDT relaying response, therefore, may be issued by the relay UE either in 1 stage after, or in 2 stages before and after, the actual relaying for the SDT relaying request is executed with the serving gNB.

In some embodiments, the SDT relaying response before the actual relaying, also referred to as the 1st stage response, may be implicit or explicit and does not include an acknowledgement from the serving network for the SDT payload. It is noted that, as the current SDT is applied for UE in RRC inactive state using the resume and suspend procedures, at least the SDT relaying response after the actual relaying, also referred to as the 2nd stage response, is expected. According to certain embodiments, the 2nd stage response may include an acknowledgement from the serving network. However, the U2N relay assisted SDT according to some embodiments allows for further flexibility and optimality in relaying operation for SDT. In one embodiment, the SDT relaying response can be sent to the remote UE using the PC5 procedure corresponding to the SDT relaying request described above.

According to certain embodiments, the remote UE may determine to retransmit or duplicate the SDT relaying request via the same relay UE or a different relay UE, based on the SDT relaying response received from the relay UE.

Figure 4:
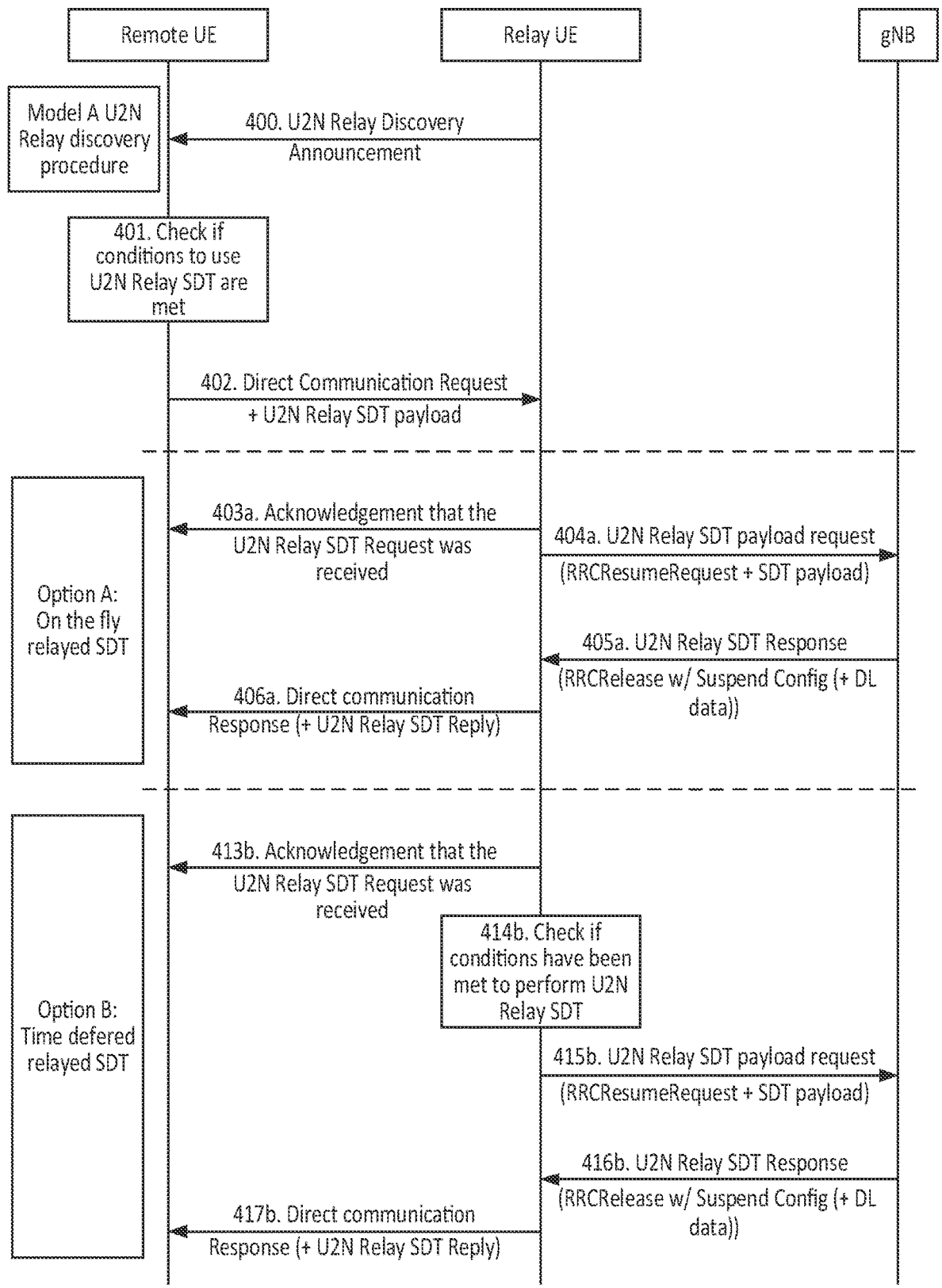
FIG. 4 illustrates an example signaling diagram depicting the performance of single shot SDT, according to an embodiment.

FIG. 4 illustrates an example signaling diagram depicting the performance of single shot SDT via a L2 U2N relay, according to an example embodiment. More specifically, FIG. 4 illustrates an example of single shot SDT via UE-to-Network relay signalling using Model A discovery, according to certain embodiments. As illustrated, the example signaling depicted in FIG. 4 may include a remote UE, relay UE (e.g., 5G ProSe U2N relay), and gNB or network node. As mentioned above, although FIG. 4 illustrates a U2N relay SDT, it should be understood that certain embodiments are not merely limited to U2N relay scenarios.

As depicted in the example of FIG. 4, at 400, a 5G ProSe UE-to-network relay UE may send a UE-to-Network relay discovery announcement message. The discovery announcement message may contain or include one or more of: an indication that SDT is supported by that relay UE, the public land mobile network (PLMN) and cell identifier (ID) of the network that the relay UE is connected to, an indication whether the relay UE supports on-the-fly relaying and/or relaying later within a time limit (e.g., a offered PDB for SDT) that may be indicated to the remote UE by the relay UE whenever suitable for the relay UE (this indication can be related to the relay UE's RRC state), and/or an indication of the supported maximum payload size for the U2N Relay assisted SDT. According to certain embodiments, the remote UE may collect the announcements of one, more than one, or all of the relay UEs in its vicinity.

As further illustrated in the example of FIG. 4, at 401, the remote UE (which desires to perform a SDT transmission) may check if conditions to use U2N relay SDT are met. In an embodiment, the check at 401 may include the remote UE applying one or more criteria to decide between a normal SDT or U2N SDT. For example, if a Uu SDT criteria are not met, then the remote UE is allowed to attempt U2N Relay SDT. In an embodiment, the remote UE may check if any of the received U2N relay discovery announcements belong to the remote UE's PLMN.

Further, according to some embodiments, there may be additional criteria in place that allow the remote UE to select U2N relay SDT. For instance, the additional criteria may include whether Uu RSRP (as observed by the remote UE based on the measurement of synchronization signal block) is below a configured threshold. Additionally or alternatively, the additional criteria may include whether the SDT payload size is below a configured payload size threshold, of which different thresholds may be configured corresponding to different channel busy radio (CBR) range and/or relay UE's RRC state. For example, if the relay UE is in RRC connected state, it might be able to support higher SDT payloads, than in the case where it is in RRC idle or in RRC inactive. This can be motivated by the available buffer at the relay UE's side, which can be assumed to be emptied faster when the relay UE is in RRC connected state. Additionally or alternatively, the additional criteria may include whether the CBR observed by the remote UE regarding the SL resource pool used for the communication with the Relay UE is below a configured threshold. According to some embodiments, in case neither Uu SDT or U2N Relay SDT meet the criteria, then the remote UE may fall back to non-SDT transmissions, which can either be via Uu or via U2N relay. In certain embodiments, the remote UE, when having detected multiple relay UEs in its vicinity associated with the PLMN to which the remote UE wants to perform the SDT, may select one of these relay UEs based on link quality criteria (e.g., RSRP associated with the discovery announcement message transmitted from the relay UE), the announced SDT payload size support (i.e., different relay UEs can announce the support of different SDT payload sizes), and/or on the support of "on the fly SDT".

As illustrated in the example of FIG. 4, at 402, the remote UE may send, in the SL resource pool, a modified direct communication request (DCR), where the DCR may be concatenated with U2N Relay SDT payload. In certain embodiments, the U2N relay SDT payload may be composed by: a RRC resume request that includes the remote UE's I-RNTI, message authentication code-integrity (MAC-I) and resume cause, and/or the actual SDT payload. The SDT payload may be encrypted and protected based on the security keys primitives with the network, when the UE had transitioned from RRC connected to RRC inactive state. It is noted that it may be assumed that the remote UE was at some point in RRC connected and then when transitioning to RRC inactive it was provided with these keys in the RRC Release with suspend configuration. According to some embodiments, the actual SDT payload can be medium access control (MAC) multiplexed with the DCR message or indicated to be transmitted to the relay UE in a future resource (e.g., based on the 1st stage SCI). In an embodiment, the U2N relay SDT payload can also indicate if it allows for time deferred SDT, which will inform the relay UE how it should deal with the SDT payload. This can also be inferred by the remote UE in case the U2N Relay SDT payload also includes a packet delay budget or indicates the associated quality of service (QoS) profile, which in turn translates to a packet delay budget.

According to certain embodiments, upon receiving the SDT U2N Relay SDT payload, the relay UE may decide if it should proceed with immediate SDT payload relay (Option A: On the fly relayed SDT in FIG. 4) or if it can defer in time the SDT payload relay (Option B: time deferred relayed SDT in FIG. 4). In both Option A and Option B, e.g., as illustrated at 403a and 413b, respectively, the relay UE can acknowledge the reception of the SDT payload. This acknowledgement can be a hybrid automatic repeat request (HARQ) acknowledgement (ACK) and/or a higher layer acknowledgement (e.g., MAC CE or RRC). In an embodiment, the acknowledgement may be a HARQ ACK, when the DCR has been sent as a unicast SL message, which means that the relay UE has received successfully the remote UE's transmission. In case the relay UE sends a HARQ NACK, then the remote UE may either retransmit, select another relay, or fall back to non-SDT transmissions, which can either be via Uu or via U2N relay. In an embodiment, the acknowledgement can be a higher layer acknowledgment (e.g., a MAC CE or RRC) that acknowledges that the SDT payload can be forwarded. In case of negative acknowledgment, the remote UE may either select another relay or fall back to non-SDT transmissions, which can be via Uu or via U2N relay.

In some embodiments, the negative acknowledgement can be due to: the relay UE foreseeing that it cannot perform the SDT payload forwarding within the packet delay budget associated with the SDT payload, the network upon receiving the forwarded SDT payload providing a negative feedback, the relay UE being unable to deliver the SDT payload to the network due to bad link conditions and/or elapsing of the maximum number of HARQ retransmissions allowed, and/or the relay UE determining that it cannot forward the SDT payload due to the I-RNTI (in the RRCResumeRequest of the U2N Relay SDT payload) indicating that the SDT payload is not intended for the PLMN for which the UE relay is performing the U2N relay.

In an embodiment, according to Option A (on the fly relay SDT), the remote UE may have indicated the need for immediate SDT relaying (or the associated packet delay budget may indicate it) and, at 404a, the relay UE may forward the U2N relay SDT payload to the network and, before proceeding, wait for a U2N relay SDT response provided by the network as shown at 405a. The immediate forwarding of the U2N Relay SDT payload may mean that the relay UE has to transition to RRC connected. In case of already being in RRC connected state, the UE may use the configured SR resources to request for resources to perform the forwarding. In case the SR resources are not configured or the latency until the next SR opportunity is outside of the packet delay budget of the SDT payload, the relay UE may instead attempt to acquire resources to perform the SDT payload forwarding, e.g., by sending a BSR via RACH.

In an embodiment, according to Option B (time deferred relayed SDT), the remote UE may have indicated that it does not require immediate SDT relaying (or the associated delay budget may indicates it). As a result, the relay UE may delay the relaying of the SDT payload until it is ready. For example, the motivation to delay the relaying of the SDT payload can include the current Uu link quality (i.e., the link quality of the direct interface between the UE and gNB) is below a configured RSRP threshold and, therefore, the relay UE defers all transmissions over the Uu interface until the Uu link quality is above the configured RSRP threshold. The motivation here may be to reduce the amount of HARQ retransmission or blind retransmissions. Additionally or alternatively, the motivation to delay the relaying of the SDT payload can include the relay UE wanting to collect the SDT and non-SDT payloads of other remote UEs and only when it has accumulated enough payload will proceed with the relaying of all the collected information. The motivation here may be to reduce signaling overheard, by transmitting all the different payloads as part of the same transmission. Additionally or alternatively, the motivation to delay the relaying of the SDT payload can include the indicated packet delay budget (or associated QoS profile) of the SDT payload is such that the relay UE does need to immediately forward the SDT payload. According to an embodiment, as illustrated at 414b of FIG. 4, the relay UE may check if the conditions have been met to perform the U2N relay SDT. Upon determining that the internal conditions to proceed have been met, the relay UE may forward, at 415b, the U2N relay SDT payload to the network and wait for a U2N Relay SDT response provided by the network as shown at 416b.

According to some embodiments, the contents of the U2N relay SDT payload may include RRC resume request that includes the remote UE's I-RNTI, message authentication code-integrity (MAC-I) and resume cause. Additionally or alternatively, the U2N relay SDT payload may include the actual SDT payload, which may be encrypted and protected based on the security primitives exchanged with the network, when the UE had transitioned from RRC connected to RRC inactive.

In some embodiments, the forwarding of the single shot U2N relay SDT payload, as shown at 404a or 415b, can be done such that, for L2 U2N Relay, the SDT payload can be inside a MAC or RRC container specified for that forwarding. Alternatively, in an embodiment, for L3 U2N Relay, the SDT payload can be inside a NAS message.

As illustrated in the example of FIG. 4, at 405a or 416b, the relay UE may receive, from the network, a U2N relay SDT response. For both Option A and Option B, the contents of the U2N relay SDT response may include RRC release with suspend configuration, so that the remote UE can return to RRC inactive while keeping updated security keys and optionally DL SDT Payload. It is noted that the contents of this response may have the same protection as any other signaling message sent via SBR #1 and can be encrypted with the security primitives exchanged between the remote UE and the network.

As further illustrated in the example of FIGS. 4, at 406a and 417b, the relay UE may transmit, to the remote UE, the direct communication response. According to an embodiment, the direct communication response may be appended with a U2N SDT relay reply.

It is noted that, in the example of FIG. 4, a 2-stage SDT relaying response is depicted, which take place at procedures 403, 404, and 406. However, in case of 1-stage SDT relaying response, then procedure 403a of "acknowledgement that the U2N Relay Request was received" may be absent or skipped, according to certain embodiments.

It is further noted that FIG. 4 is provided as just one example of signaling between network nodes, according to some embodiments. However, it should be understood that various modifications and changes can be made to the example of FIG. 4, according to further embodiments.

As one example modification, some embodiments may not necessarily be directed to U2N relay SDT scenarios, but may be applicable to other relay SDT scenarios, such as but not limited to Uu SDT. For instance, in some embodiments, the network (e.g., gNB in FIG. 4) may support U2N SDT and/or Uu SDT. In such a case where the network might support both U2N SDT and Uu SDT, the UE may determine, at 401, if the conditions to use U2N SDT and/or Uu SDT are met. If the conditions for both U2N SDT and Uu SDT are met, then, in certain embodiments, the network might prioritize Uu SDT over U2N SDT or vice versa. Such prioritization may be indicated by the gNB in system information, for example.

In some embodiments, prior to the transmission of the SDT payload to the relay UE, the remote UE may perform a check of all SDT criteria. In case any of the SDT criteria fails, then the remote UE may fall back to, e.g., using SDT directly to the serving gNB and/or using the relay UE with regular relaying mode for the SDT. In such a case, the remote UE may not transmit the SDT relaying request to the relay UE. According to an embodiment, in case the SDT criteria fails regarding a specific relay UE, then the remote UE can select another relay UE (if available) and perform the same or similar set of criteria.

After the remote UE has sent the SDT payload to the relay UE, it can wait for an acknowledgement, which can be in the form of a HARQ ACK and/or higher layer acknowledgement (e.g., MAC CE or RRC). In case of negative acknowledgement, the remote UE may select another relay UE that supports SDT or may transition to non-SDT transmissions.

After the remote UE has sent the SDT payload, it may start a first timer until it receives an acknowledgement either from initial SDT payload transmission (i.e., the acknowledgement that the relay UE received the SDT payload to be relayed) and a second timer until it receives an acknowledgement from the network (i.e., the SDT network feedback, given by the RRC Release with suspend configuration). If any of these timers expires without the associated acknowledgement, then the SDT may be assumed to have failed and the remote UE may select another relay UE that support SDT or transition to non-SDT transmissions.

According to some embodiments, in case of an error when forwarding the SDT payload to the network, then the relay UE may provide a negative acknowledgement to the remote UE. This negative acknowledgement may be transmitted, when the relay UE determines that the error handling timers have not yet elapsed at the remote UE (i.e., the remote UE is still waiting for an acknowledgement from the relay UE).

In an embodiment, upon forwarding the SDT payload to the network, the relay UE can initiate a timer. If the network does not provide a feedback during that timer, then the relay UE may provide a negative acknowledgement to the remote UE.

According to an embodiment, upon receiving the SDT payload from the remote UE, if the relay UE is in RRC Idle, the relay UE may transition to RRC connected state before it can forward the SDT payload. However, if the relay UE is in RRC inactive and it has its own SDT configuration, then the relay UE can use one of the SDT modes to convey the remote UE SDT.

In some embodiments, when configured with CG-SDT, the remote UE can inform the relay UE about its configured CG-SDT occasions, and this will allow the relay UE to utilize these resources to convey the remote UE's SDT payload in those same resources (when the relay UE is able to meet the validation requirements to use those resources).

According to one embodiment, in case the relay UE is in RRC idle or RRC inactive state and needs to relay the SDT for the remote UE, the relay UE may use the resume procedure for RRC inactive UE with the contexts of the remote UE provided in the received SDT relaying request to relay the SDT for the remote UE. The serving network may use the suspend procedure to release both the relay UE and the remote UE.

In one embodiment, the relay UE may be allowed to support the U2N relay assisted SDT only when the relay UE is in RRC connected state, as this may not cause notable overhead over Uu interface at least in case the SDT can be multiplexed with other UL data transmissions of the relay UE instead of padding.

According to one embodiment, the remote UE may be allowed to select more than one relay UE or all possible relay UEs in proximity for relaying the SDT, e.g., in case the SDT is of high reliability and low latency. In this case, the PC5 message carrying the SDT, such as the DCR in the example of FIG. 4, may be broadcast to all possible relay UEs in proximity. This may result in duplication at the network side, e.g., the same SDT of the remote UE from more than one relay UEs to the same serving gNB and/or data forwarding of the same SDT from different serving gNBs to the anchor gNB of the remote UE.

Figure 5:
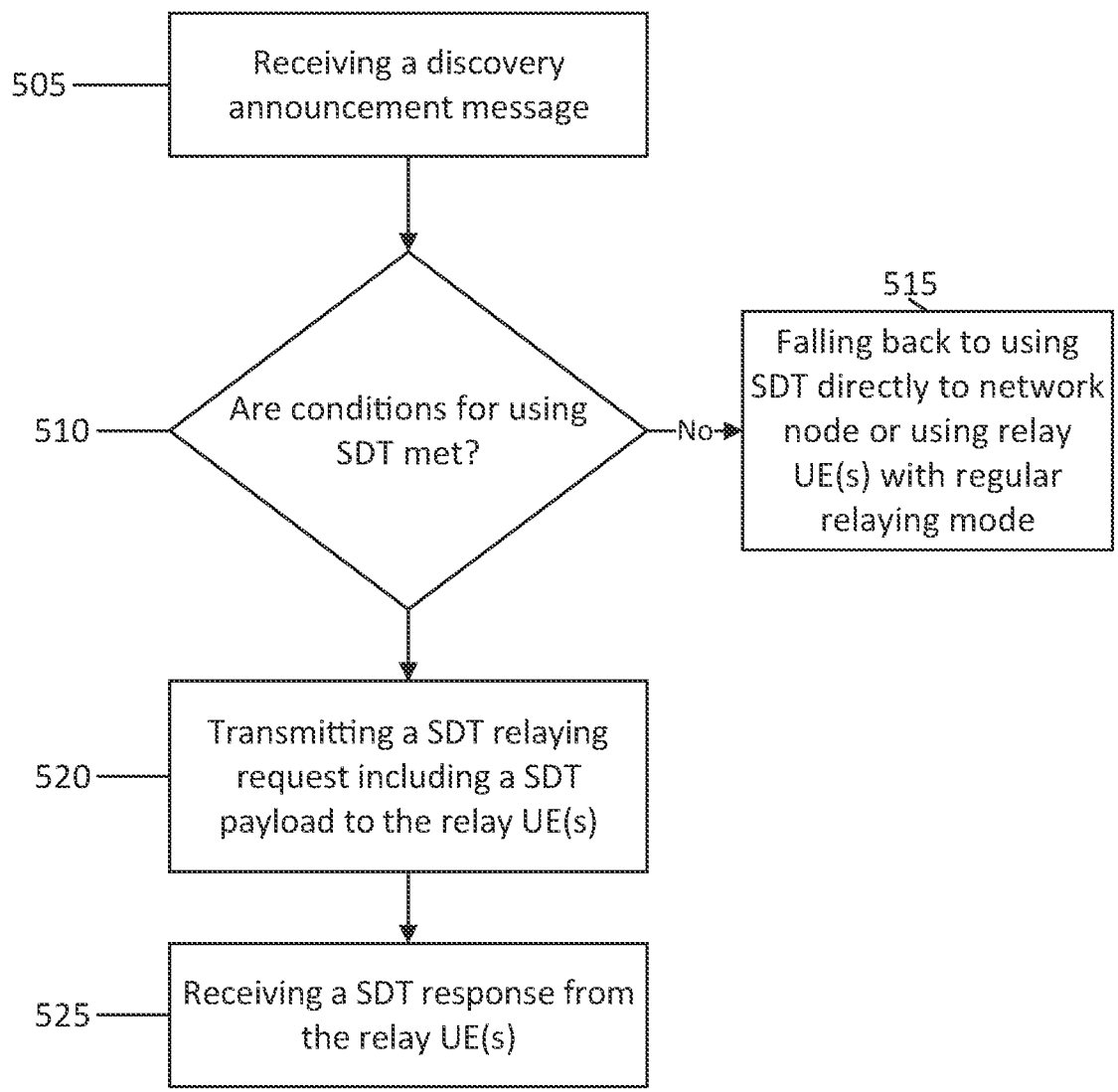
FIG. 5 illustrates an example flow diagram of a method, according to an embodiment.

FIG. 5 illustrates an example flow diagram of a method for relay assisted SDT, according to an example embodiment. For instance, in some embodiments, the relay assisted SDT may include U2N relay assisted SDT or Uu SDT (e.g., SDT over a direct interface between the UE and the network node). In certain example embodiments, the flow diagram of FIG. 5 may be performed by a network entity or communication device in a communications system such as, but not limited to, LTE, 5G NR, or beyond 5G (e.g., 6G). For instance, in some example embodiments, the communication device performing the method of FIG. 5 (and operations discussed below) may include or be included in a user device, UE, sidelink (SL) UE, wireless device, mobile station, IoT device, UE type of roadside unit (RSU), a wireless transmit/receive unit, customer premises equipment (CPE), other mobile or stationary device, or the like. For instance, in certain example embodiments, the method of FIG. 5 may include procedures or operations performed by a remote UE, such as the remote UE illustrated in FIG. 4, or as described or illustrated elsewhere herein.

As illustrated in the example of FIG. 5, in some embodiments, the method may optionally include, at 505, receiving a discovery announcement message from at least one relay UE in a vicinity of the remote user equipment. According to one embodiment, the discovery announcement message may be a U2N relay discovery announcement message. In an embodiment, the discovery announcement message may include at least an indication of whether SDT is supported by the at least one relay UE. According to an embodiment, the method may include, at 510, determining whether conditions to use SDT are met. For instance, in some embodiments, the determining 510 of whether the conditions to use SDT are met may include determining whether the at least one relay UE supports SDT based on the indication received in the discovery announcement message. According to certain embodiments, the determining 510 may include determining whether conditions to use U2N relay SDT and/or to use Uu relay SDT, i.e., relay SDT over the direct interface between the UE and the network node, are met.

In some embodiment, the discovery announcement message may further include, or the remote UE may receive/obtain from the serving network node (e.g., gNB) in broadcast system information, one or more of: the PLMN and cell ID of a network that the at least one relay UE is connected to, an indication whether the at least one relay UE supports on-the-fly SDT relaying or SDT relaying later within a time limit suitable for the at least one relay user equipment, and/or an indication of a supported maximum payload size for the SDT (e.g., U2N relay assisted SDT or Uu SDT). According to an embodiment, the received PLMN and cell ID may be used to determine whether the conditions to use SDT are met at 510.

According to some embodiments, the determining 510 may include applying one or more criteria to determine whether the conditions to use SDT are met, i.e., to determine whether the at least one relay UE supports SDT. In certain embodiments, the conditions and/or criteria may include one or more of the validation criterion to decide between normal SDT or U2N SDT discussed above in connection with the example of FIG. 4. For instance, the applying of the criteria and/or the conditions may include one or more of: determining if U2N relay SDT or SDT over a direct interface (Uu SDT) between the UE and the network node meet the criteria; determining if the discovery announcement message indicates support of SDT relaying for a PLMN of the remote UE; determining if RSRP observed by the remote UE is below a configured threshold; determining if the SDT payload is below a configured threshold; or determining if a channel busy ratio observed by the remote UE regarding a sidelink resource pool used for communication with the at least one relay UE is below a configured threshold. For example, the RSRP observed by the remote UE may include RSRP measured from the discovery announcement message (e.g., where it is U2N relay SDT) and/or from a SSB or group of SSBs (e.g., where it is Uu SDT). Further, in certain embodiments, when determining if the SDT payload is below a configured threshold, there can be different configured thresholds for U2N relay SDT and Uu SDT.

When it is determined that the conditions to use the SDT are met, the method may include, at 520, transmitting a SDT relaying request including a SDT payload to the at least one relay UE and, at 525, receiving a SDT response from the at least one relay UE. For instance, the SDT response received at 525 may be due to relaying, i.e., it may be a SDT relaying response to the SDT relaying request. The manner in which the SDT response is received at 525 may depend on how the SDT relaying request is transmitted. When it is determined that the conditions to use the SDT are not met, the method may include, at 515, falling back to using SDT directly to the serving network node (e.g., gNB) or using the at least one relay UE with regular relaying mode for the SDT.

In some embodiments, when PC5 connection establishment between the remote UE and the at least one relay UE is needed, the transmitting 520 may include transmitting the SDT relaying request using a direct communication request (DCR). Alternatively, when PC5 connection establishment between the remote UE and the at least one relay UE is not needed, the transmitting 520 may include transmitting the SDT relaying request using an existing PC5 connection or a new PC5 connection for carrying the SDT relaying request.

According to an embodiment, the method may include receiving an acknowledgement, from the at least one relay UE, of reception of the SDT payload. For instance, the acknowledgement may be a HARQ ACK when the DCR has been sent as a unicast SL message, or may be a higher layer acknowledgement (e.g., MAC CE or RRC) to acknowledge that the SDT payload can be forwarded. In a further embodiment, the method may include receiving a negative acknowledgement from the at least one relay UE, and, in this case, the remote UE may select another relay user equipment or fall back to non-SDT transmissions.

According to certain embodiments, the SDT payload may include one or more of: a resume request including the remote user equipment's inactive radio network temporary identifier (I-RNTI), message authentication code-integrity (MAC-I), and/or resume cause; the actual small data transmission (SDT) payload when the remote UE transitioned from a (RRC) connected state to (RRC) inactive state; and/or an indication of whether the SDT payload allows for time deferred SDT relaying or requires immediate SDT relaying.

In some embodiments, the method may include determining, by the remote UE, to retransmit or duplicate the SDT relaying request via the at least one relay UE or a different relay UE, depending on the SDT relaying response received from the at least one relay device.

Figure 6:
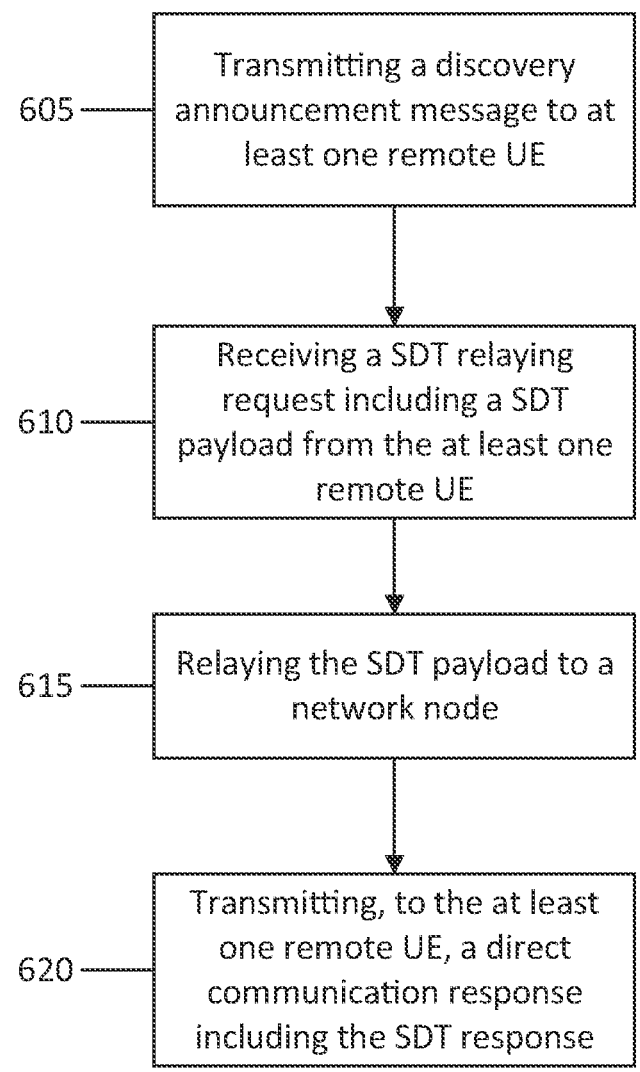
FIG. 6 illustrates an example flow diagram of a method, according to an embodiment.

FIG. 6 illustrates an example flow diagram of a method for relay assisted SDT, according to an example embodiment. For instance, in some embodiments, the relay assisted SDT may include U2N relay assisted SDT or Uu SDT (e.g., SDT over a direct interface between the UE and the network node). In certain example embodiments, the flow diagram of FIG. 6 may be performed by a network entity or communication device in a communications system such as, but not limited to, LTE, 5G NR, or beyond 5G (e.g., 6G). For instance, in some example embodiments, the communication device performing the method of FIG. 6 (and operations discussed below) may include or be included in a user device, UE, sidelink (SL) UE, wireless device, mobile station, IoT device, UE type of roadside unit (RSU), a wireless transmit/receive unit, customer premises equipment (CPE), other mobile or stationary device, or the like. For instance, in certain example embodiments, the method of FIG. 6 may include procedures or operations performed by a relay UE, such as the relay UE illustrated in FIG. 4, or as described or illustrated elsewhere herein.

As illustrated in the example of FIG. 6, the method may optionally include, at 605, transmitting, by the relay UE, a discovery announcement message to at least one remote UE in a vicinity of the relay UE. The discovery announcement message may include at least an indication that SDT is supported by the relay UE. For example, the SDT supported by the relay UE may include U2N relay SDT and/or Uu SDT. According to some embodiments, the discovery announcement message may include one or more of: the PLMN and cell ID of a network that the relay UE is connected to, an indication whether the relay UE supports on-the-fly SDT relaying or SDT relaying later within a time limit suitable for the relay UE, or an indication of a supported maximum payload size for the SDT.

In an embodiment, the method may include, at 610, receiving a SDT relaying request including a SDT payload from the at least one remote UE. According to certain embodiments, the SDT payload may include at least one of: a resume request including at least one of the remote UE's inactive radio network temporary identifier (I-RNTI), message authentication code-integrity (MAC-I), or resume cause; the actual SDT payload when the remote UE transitioned from a connected state to inactive state; and/or an indication of whether the SDT payload allows for time deferred SDT relaying or requires immediate SDT relaying.

According to certain embodiments, the method may include, at 615, relaying the SDT payload to a network node (e.g., gNB). In some embodiments, based on the SDT payload received from the at least one remote user equipment, the method may include, e.g., prior to performing the relaying at 615, determining whether to proceed with immediate relaying of the SDT payload or to defer in time the relaying of the SDT payload.

In some embodiments, the determining of whether to proceed with the immediate relaying or to defer the relaying of the SDT payload may include determining to proceed with the immediate relay of the SDT payload when the SDT payload indicates a need for immediate SDT relaying or when an associate packet delay budget indicates a need for immediate SDT relaying. In this embodiment, the method may then include forwarding the SDT payload to the network node (e.g., gNB), transitioning to a (RRC) connected state if the relay UE is not already in the connected state, and receiving, from the network node, a SDT relay response that may include a release with suspend configuration so that the at least one remote UE can return to (RRC) inactive state and optionally including a downlink SDT payload.

According to some embodiments, the determining of whether to proceed with the immediate relaying or to defer the relaying of the SDT payload may include determining to defer in time the relay of the SDT payload when the SDT payload indicates that it does not require immediate SDT relaying or when an associated packet delay budget indicates it does not require immediate SDT relaying. In this case, the method may include delaying relaying of the SDT payload until the relay UE is ready to forward the SDT payload and, when conditions to proceed with forwarding of the small data transmission (SDT) payload are met, forwarding the SDT payload to a network node (e.g., gNB). The method may also include receiving, from the network node, a SDT relay response including a release with suspend configuration so that the at least one remote UE can return to (RRC) inactive state and optionally including a downlink SDT payload. In certain embodiments, the conditions to proceed with the forwarding of the small data transmission (SDT) payload may be considered to be met: when a current Uu link quality, e.g., measured based on a SSB, is above a configured RSRP threshold, and/or when the relay UE has collected sufficient SDT and non-SDT payloads of other remote UE to transmit the different payloads as part of a same transmission to the network node.

In an embodiment, the method of FIG. 6 may also include, at 620, transmitting, to the at least one remote UE, a direct communication response including the SDT response. For example, in an embodiment, the SDT response may be due to SDT relaying and, therefore, the SDT response may be a SDT relay response.

Figure 7:
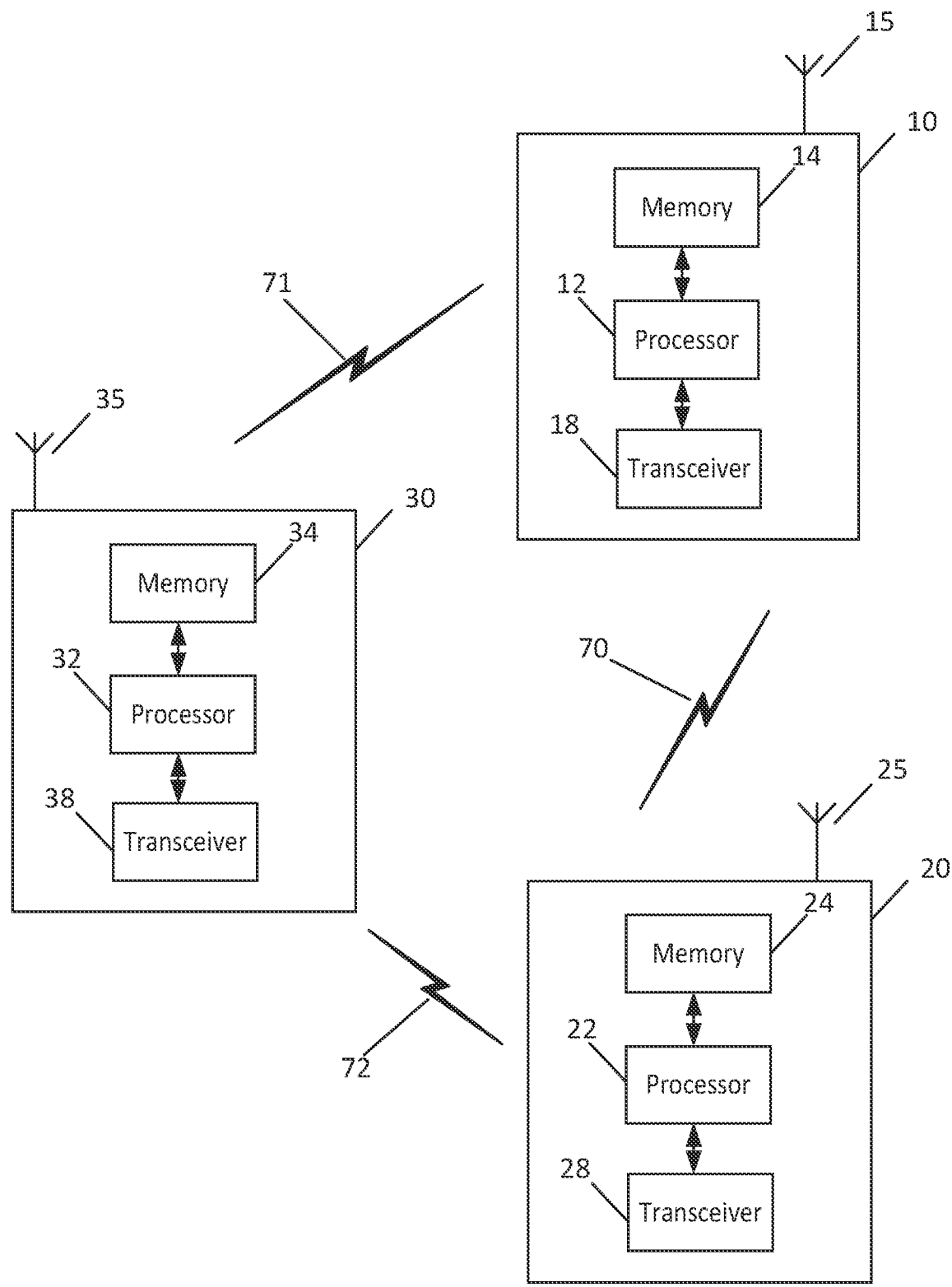
FIG. 7 illustrates an example of a system including multiple apparatuses, according to certain embodiments.

FIG. 7 illustrates an example of an apparatus 10, apparatus 20, and apparatus 30, according to certain example embodiments. In an embodiment, apparatus 10 may be a node, host, or server in a communications network or serving such a network. For example, apparatus 10 may be a UE, mobile equipment (ME), mobile station, mobile device, stationary device, IoT device, TSN device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like. It should be noted that one of ordinary skill in the art would understand that apparatus 10 may include components or features not shown in FIG. 7.

As illustrated in the example of FIG. 7, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources. In certain examples, processor 12 may be configured as a processing means or controlling means for executing any of the procedures described herein.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein. In certain example embodiments, memory 14 may be configured as a storing means for storing any information or instructions for execution as discussed elsewhere herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of NB-IoT, LTE, 5G, WLAN, Bluetooth, BT-LE, NFC, radio frequency identifier (RFID), ultrawideband (UWB), Multe-Fire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. In certain example embodiments, transceiver 18 may be configured as a transceiving means for transmitting or receiving information as discussed elsewhere herein. Additionally or alternatively, in some embodiments, apparatus 10 may include an input and/or output device (I/O device) or means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may include a user device, UE (e.g., SL UE), mobile device, mobile station, ME, IoT device and/or NB-IoT device, for example. For example, in some embodiments, apparatus 10 may be configured to perform one or more of the processes depicted in any of the flow charts or signaling diagrams described herein, such as those illustrated in the examples of FIGS. 3-6. For instance, in some embodiments, apparatus 10 may be configured to perform one or more of the operations performed by the remote UE illustrated in FIG. 4. In some embodiments, as discussed herein, apparatus 10 may be configured to perform a procedure relating to SDT, such as U2N relay assisted or Uu SDT, for instance. For instance, in an embodiment, apparatus 10 may be configured, or controlled by processor 12, memory 14 and/or transceiver 18, to carry out the procedures described above with respect to FIG. 5.

FIG. 7 further illustrates an example of an apparatus 20, according to an embodiment. In an embodiment, apparatus 20 may be a node, host, or server in a communications network or serving such a network. For example, apparatus 20 may be a network node, satellite, base station, a Node B, an evolved Node B (eNB), 5G Node B or access point, next generation Node B (NG-NB or gNB), TRP, HAPS, Remote Radio Head (RRH), integrated access and backhaul (IAB) node, and/or a WLAN access point, associated with a radio access network, such as a LTE network, 5G or NR, or beyond 5G, or any other 3GPP system. In some example embodiments, apparatus 20 may be gNB or other similar radio node, for instance.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 7.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as LTE, LTE-A, NR, 5G, WLAN, WiFi, NB-IoT, Bluetooth, NFC, MulteFire, and/or any other radio access technologies or 3GPP system. It should be noted that one of ordinary skill in the art would understand that apparatus 20 may include components or features not shown in FIG. 7.

As illustrated in the example of FIG. 7, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry/means or control circuitry/means. In addition, in some embodiments, transceiver 28 may be included in or may form a part of transceiving circuitry, processing or control circuitry or transceiving means, for example.

As discussed above, according to some embodiments, apparatus 20 may be or may be a part of a network element or RAN node, such as a base station, access point, Node B, eNB, gNB, TRP, RRH, HAPS, IAB node, relay node, WLAN access point, satellite, or the like. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 3-6. In certain embodiments, apparatus 20 may include or represent a network node, such as the gNB illustrated in the example of FIG. 4. According to an embodiment, apparatus 20 may be configured to perform a procedure relating to SDT, such as U2N relay assisted or Uu SDT, for instance.

FIG. 7 further illustrates an example of an apparatus 30, according to an example embodiment. In an example embodiment, apparatus 30 may be a node or element in a communications network or associated with such a network, such as a user device, UE, mobile equipment (ME), mobile station, mobile device, stationary device, IoT device, TSN device, or other device. As described herein, UE may alternatively be referred to as, for example, a mobile station, mobile equipment, mobile unit, mobile device, user device, subscriber station, wireless terminal, tablet, smart phone, IoT device or NB-IoT device, a connected car, or the like. As one example, apparatus 30 may be implemented in, for instance, a wireless handheld device, a wireless plug-in accessory, or the like.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as LTE, LTE-A, NR, 5G, WLAN, WiFi, NB-IoT, MulteFire, and/or any other radio access technologies or 3GPP system. It should be noted that one of ordinary skill in the art would understand that apparatus 30 may include components or features not shown in FIG. 7.

As illustrated in the example of FIG. 7, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 7, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry, processing circuitry and/or control circuitry.

As discussed above, according to some example embodiments, apparatus 30 may be a user device, UE (e.g., SL UE), mobile device, mobile station, ME, IoT device, TSN device and/or NB-IoT device, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein, such as the processes illustrated in the examples of FIGS. 3-6. As an example, apparatus 30 may correspond to or represent a relay UE, such as that illustrated in the example of FIG. 4. According to certain example embodiments, apparatus 30 may be configured to perform a procedure relating to SDT, such as U2N relay assisted or Uu SDT, for instance. For instance, in an embodiment, apparatus 30 may be configured, or controlled by processor 32, memory 34 and/or transceiver 38, to carry out the procedures described above with respect to FIG. 6.

In some example embodiments, an apparatus (e.g., apparatus 10 and/or apparatus 20 and/or apparatus 30) may include means for performing a method, a process, or any of the variants discussed herein. Examples of the means may include one or more processors, memory, controllers, transmitters, receivers, sensors, circuits, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. For example, as discussed in detail above, certain example embodiments can provide an improved U2N relay SDT, which significantly reduces the number of signaling messages exchanged before SDT transmission from a remote UE can take place. For example, certain embodiments allow the remote UE to perform SDT transmission with a reduced number of message exchanges. As a result, example embodiments can reduce, for instance, signaling, latency and/or power consumption. Accordingly, the use of certain example embodiments results in improved functioning of communications networks and their nodes, such as base stations, eNBs, gNBs, and/or IoT devices, UEs or mobile stations, or the like.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations needed for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, some functionality of example embodiments may be implemented as a signal that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Some embodiments described herein may use the conjunction "and/or". It should be noted that, when used, the term "and/or" is intended to include either of the alternatives or both of the alternatives, depending on the example embodiment or implementation. In other words, "and/or" can refer to one or the other or both, or any one or more or all, of the things or options in connection with which the conjunction is used.

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:
   at least one processor; and
   at least one memory comprising computer program code,
   the at least one memory and computer program code configured, with the at least one processor, to cause the apparatus at least to:
   receive a discovery announcement message from at least one relay user equipment in a vicinity of the apparatus, wherein the discovery announcement message comprises an indication of whether small data transmission (SDT) is supported by the at least one relay user equipment,
   wherein the discovery announcement message comprises, or the at least one memory and computer program code are configured, with the at least one processor, to cause the apparatus at least to obtain: an indication whether the at least one relay user equipment supports an immediate small data transmission (SDT) relaying or small data transmission (SDT) relaying later within a time limit suitable for the at least one relay user equipment;
   determine whether conditions to use the small data transmission (SDT) via the at least one relay user equipment are met;
   when it is determined that the conditions to use the small data transmission (SDT) are met, transmit a small data transmission (SDT) relaying request comprising a small data transmission (SDT) payload to the at least one relay user equipment; and
   receive a small data transmission (SDT) response from the at least one relay user equipment.

2. The apparatus of claim 1, wherein, to determine whether the conditions to use the small data transmission (SDT) are met, the at least one memory and computer program code are configured, with the at least one processor, to cause the apparatus at least to determine whether the at least one relay user equipment supports small data transmission (SDT) based on the indication received in the discovery announcement message.

3. The apparatus of claim 1, wherein the discovery announcement message comprises or the apparatus is configured to obtain at least one of:
   a public land mobile network (PLMN) and cell identifier (ID) of a network that the at least one relay user equipment is connected to, or
   an indication of a supported maximum payload size for the small data transmission (SDT).

4. The apparatus of claim 3, wherein the public land mobile network (PLMN) and cell identifier (ID) of a network is used to determine at least one of:
   a configuration of the conditions to use small data transmission (SDT); or
   whether the conditions to use small data transmission are met.

5. The apparatus of claim 1, wherein the small data transmission (SDT) comprises at least one of user equipment (UE)-to-network relay small data transmission (SDT) or small data transmission (SDT) over a direct interface between the apparatus and a network node.

6. The apparatus of claim 2, wherein the at least one memory and computer program code are configured, with the at least one processor, to cause the apparatus at least to apply criteria to determine whether the at least one relay user equipment supports small data transmission (SDT),
   wherein the applying of the criteria comprises at least one of:
   determining if at least one of user equipment (UE)-to-network relay small data transmission (SDT) or small data transmission (SDT) over a direct interface between the apparatus and a network node meet the criteria;
   determining if the discovery announcement message indicates support of small data transmission (SDT) relaying for a public land mobile network (PLMN) of the apparatus;
   determining if reference signal received power (RSRP) observed by the apparatus is below a configured threshold, wherein the reference signal received power (RSRP) is measured from the discovery announcement message or from one or more synchronization signal blocks;
   determining if the small data transmission (SDT) payload is below a configured threshold; or
   determining if a channel busy ratio observed by the apparatus regarding a sidelink resource pool used for communication with the at least one relay user equipment is below a configured threshold.

7. The apparatus of claim 1, wherein, when it is determined that the conditions to use the user equipment (UE)-to-network relay small data transmission (SDT) are not met, the at least one memory and computer program code are configured, with the at least one processor, to cause the apparatus at least to fall back to using small data transmission (SDT) directly to the serving network node or using the at least one relay user equipment with regular relaying mode for the small data transmission (SDT).

8. The apparatus of claim 1, wherein the small data transmission (SDT) payload comprises at least one of:
   a resume request including at least one of the apparatus' inactive radio network temporary identifier (I-RNTI), message authentication code-integrity (MAC-I), or resume cause;
   the actual small data transmission (SDT) payload when the apparatus transitioned from inactive state to connected state; or
   an indication of whether the small data transmission (SDT) payload allows for time deferred small data transmission (SDT) relaying or requires immediate small data transmission (SDT) relaying.

9. The apparatus of claim 1,
   wherein, when PC5 connection establishment between the apparatus and the at least one relay user equipment is needed, the at least one memory and computer program code are configured, with the at least one processor, to cause the apparatus at least to transmit the small data transmission (SDT) relaying request using a direct communication request (DCR); or
   wherein, when PC5 connection establishment between the apparatus and the at least one relay user equipment is not needed, the at least one memory and computer program code are configured, with the at least one processor, to cause the apparatus at least to transmit the small data transmission (SDT) relaying request using an existing PC5 connection or a new PC5 connection for carrying the small data transmission (SDT) relaying request.

10. The apparatus of claim 1, wherein the at least one memory and computer program code are configured, with the at least one processor, to cause the apparatus at least to determine to retransmit or duplicate the small data transmission (SDT) relaying request via the at least one relay user equipment or a different relay user equipment, depending on the small data transmission (SDT) response received from the at least one relay device.

11. An apparatus, comprising:
at least one processor; and
at least one memory comprising computer program code,
the at least one memory and computer program code configured, with the at least one processor, to cause the apparatus at least to:
transmit a discovery announcement message to at least one remote user equipment in a vicinity of the apparatus, wherein the discovery announcement message comprises at least an indication that small data transmission (SDT) is supported by the apparatus;
wherein the discovery announcement message comprises an indication whether the apparatus supports an immediate small data transmission (SDT) relaying or small data transmission (SDT) relaying later within a time limit suitable for the apparatus;
receive a small data transmission (SDT) relaying request comprising a small data transmission (SDT) payload from the at least one remote user equipment; and
relay the small data transmission (SDT) payload to a network node.

12. The apparatus of claim 11, wherein, based on the small data transmission (SDT) payload received from the at least one remote user equipment, the at least one memory and computer program code are configured, with the at least one processor, to cause the apparatus at least to determine whether to proceed with immediate relay of the small data transmission (SDT) payload or to defer in time the relay of the small data transmission (SDT) payload.

13. The apparatus of claim 11, wherein the small data transmission (SDT) supported by the apparatus comprises at least one of user equipment (UE)-to-network relay small data transmission (SDT) or small data transmission (SDT) over a direct interface between the apparatus and the network node.

14. The apparatus of claim 11, wherein the discovery announcement message comprises at least one of:
a public land mobile network (PLMN) and cell identifier (ID) of the network that the apparatus is connected to, or
an indication of a supported maximum payload size for the small data transmission (SDT).

15. The apparatus of claim 11, wherein the small data transmission (SDT) payload comprises at least one of:
a resume request including at least one of the remote user equipment's inactive radio network temporary identifier (I-RNTI), message authentication code-integrity (MAC-I), or resume cause;
the actual small data transmission (SDT) payload when the remote user equipment transitioned from a connected state to inactive state; or
an indication of whether the small data transmission (SDT) payload allows for time deferred small data transmission (SDT) relaying or requires immediate small data transmission (SDT) relaying.

16. The apparatus of claim 12, wherein the apparatus is configured to determine to proceed with the immediate relay of the small data transmission (SDT) payload when the small data transmission (SDT) payload indicates a need for immediate small data transmission (SDT) relaying or when an associated packet delay budget indicates a need for immediate small data transmission (SDT) relaying, and
wherein the at least one memory and computer program code are configured, with the at least one processor, to cause the apparatus at least to:
forward the small data transmission (SDT) payload to the network node;
transition to a connected state if the apparatus is not already in the connected state; and
receive, from the network node, a small data transmission (SDT) relay response comprising a release with suspend configuration so that the at least one remote user equipment can return to inactive state and optionally comprising a downlink small data transmission (SDT) payload.

17. The apparatus of claim 12, wherein the apparatus is configured to determine to defer in time the relay of the small data transmission (SDT) payload when the small data transmission (SDT) payload indicates that it does not require immediate small data transmission (SDT) relaying or when an associated packet delay budget indicates it does not require immediate small data transmission (SDT) relaying, and
wherein the at least one memory and computer program code are configured, with the at least one processor, to cause the apparatus at least to:
delay relaying of the small data transmission (SDT) payload until the apparatus is ready to forward the small data transmission (SDT) payload;
when conditions to proceed with forwarding of the small data transmission (SDT) payload are met, forward the small data transmission (SDT) payload to a network node; and
receive, from the network node, a small data transmission (SDT) relay response comprising a release with suspend configuration so that the at least one remote user equipment can return to inactive state and optionally comprising a downlink small data transmission (SDT) payload.

18. The apparatus of claim 17, wherein the conditions to proceed with the forwarding of the small data transmission (SDT) payload are met when at least one of:
a current link quality of over a direct interface between the apparatus and the network node, which is measured based on a synchronization signal block, is above a configured reference signal received power (RSRP) threshold; or
when the apparatus has collected sufficient small data transmission (SDT) and non-small data transmission (SDT) payloads of other remote user equipment to transmit the different payloads as part of a same transmission to the network node.

19. The apparatus of claim 16, wherein the at least one memory and computer program code are configured, with the at least one processor, to cause the apparatus at least to:
transmit, to the at least one remote user equipment, a direct communication response comprising the small data transmission (SDT) relay response.

20. A method, comprising:

transmitting, by a relay user equipment, a discovery announcement message to at least one remote user equipment in a vicinity of the relay user equipment, wherein the discovery announcement message comprises at least an indication that small data transmission (SDT) is supported by the relay user equipment;

wherein the discovery announcement message comprises an indication whether the relay user equipment supports an immediate small data transmission (SDT) relaying or small data transmission (SDT) relaying later within a time limit suitable for the relay user equipment;

receiving a small data transmission (SDT) relaying request comprising a small data transmission (SDT) payload from the at least one remote user equipment; and relaying the small data transmission (SDT) payload to a network node.

* * * * *